Dec. 10, 1957    A. W. FORMAN ET AL    2,815,920
AUTOMATIC WEIGHER
Filed Aug. 10, 1953    6 Sheets-Sheet 1

Inventors
Arthur W. Forman
Albert E. Lovett
Malcolm Salway-Walle.
By their Attorney Dec. 10, 1957  A. W. FORMAN ET AL  2,815,920
AUTOMATIC WEIGHER
Filed Aug. 10, 1953  6 Sheets-Sheet 2
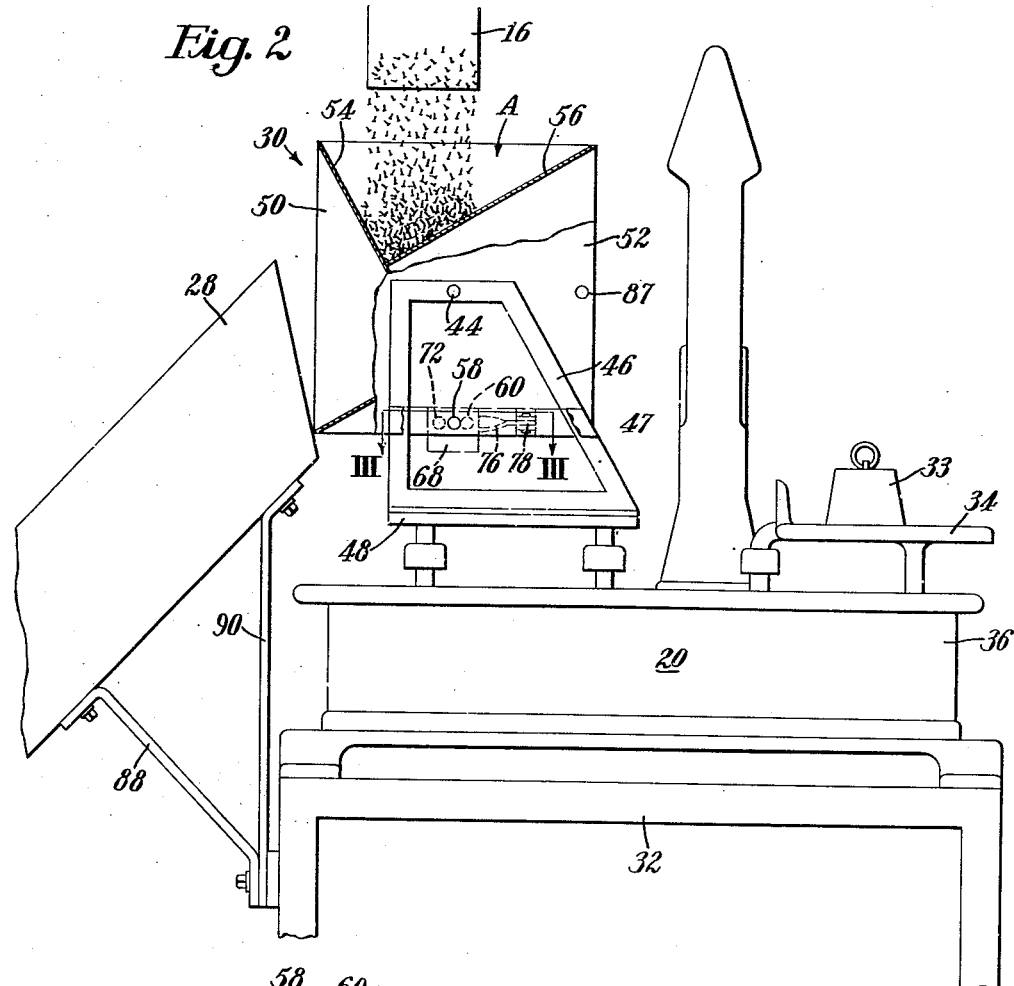
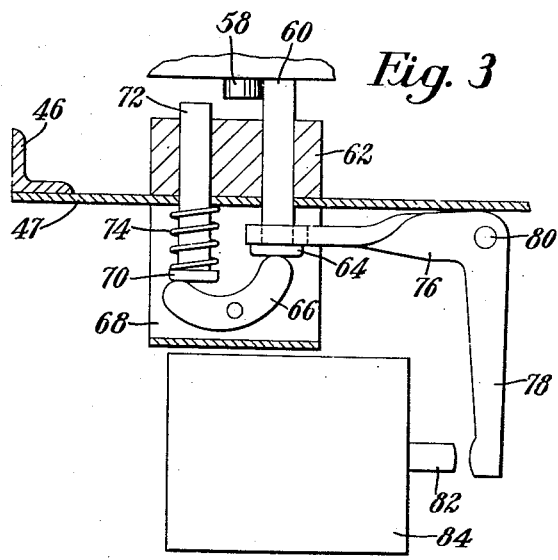
Inventors
Arthur W. Forman
Albert E. Lovett
Malcolm Salway-Waller
By their Attorney

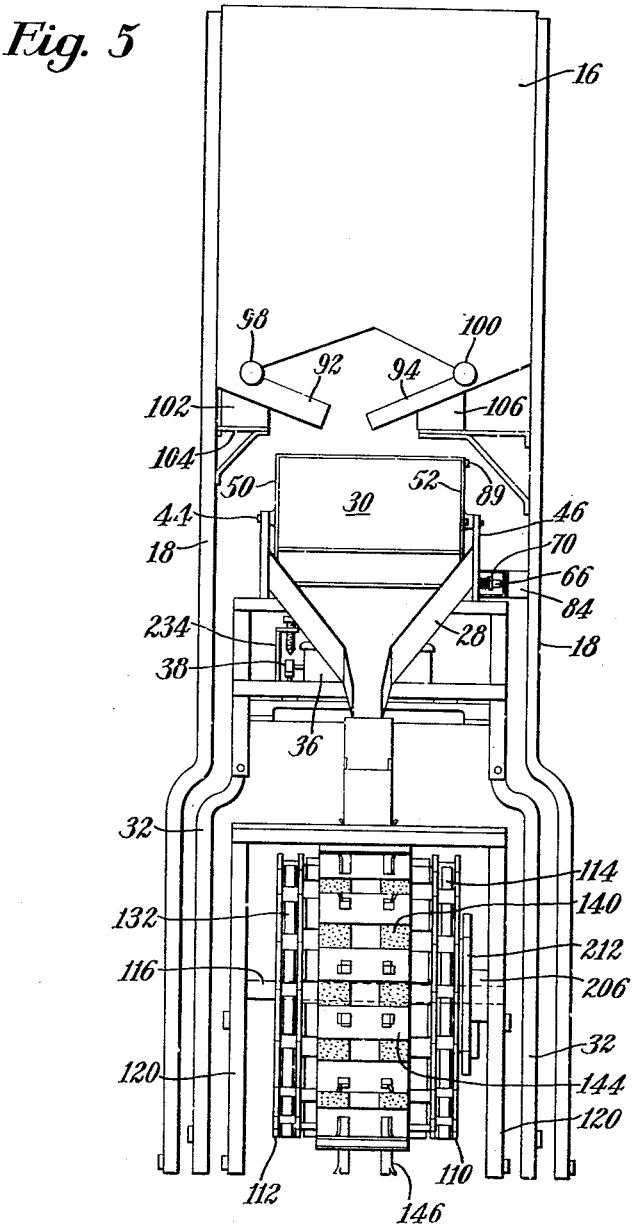

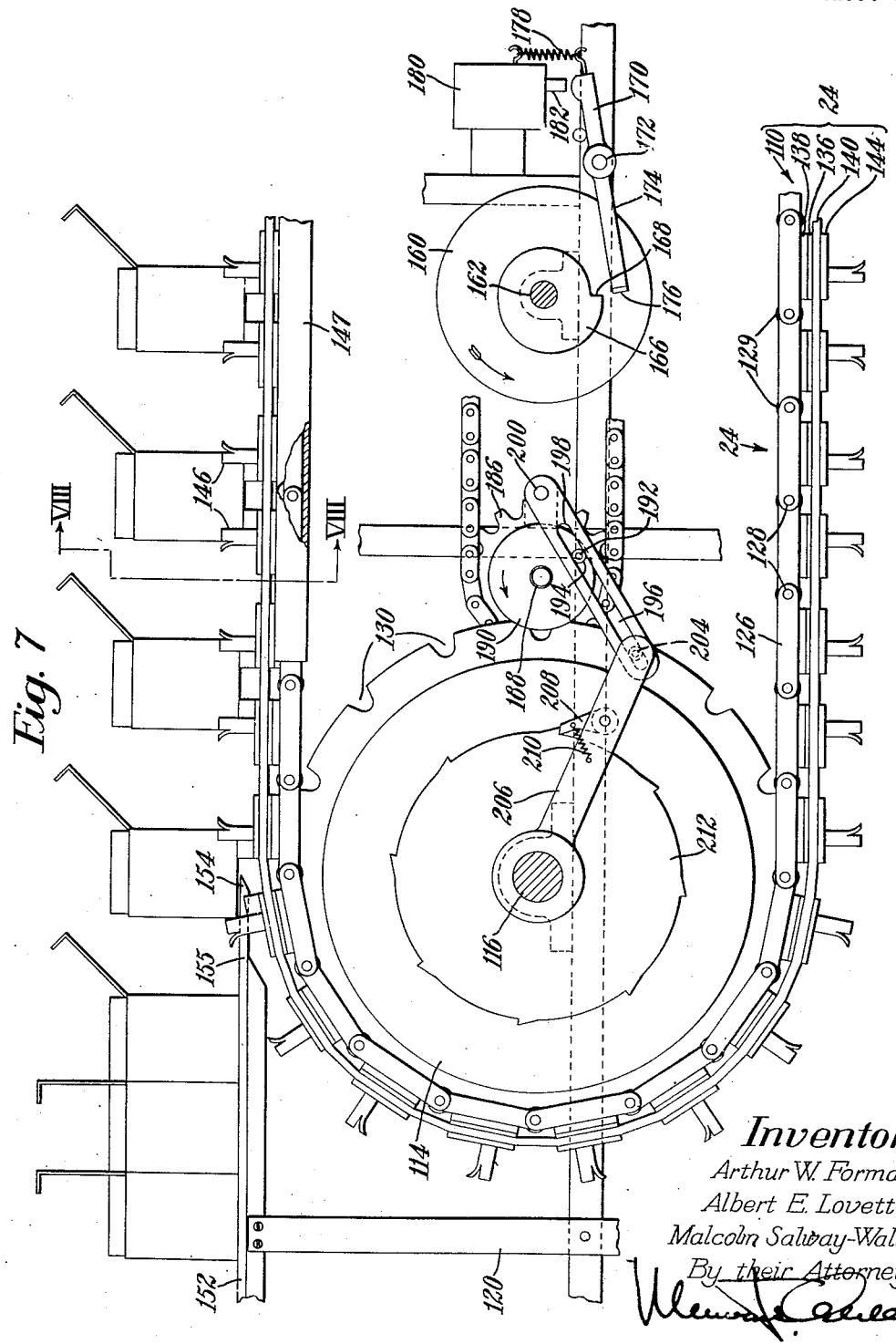

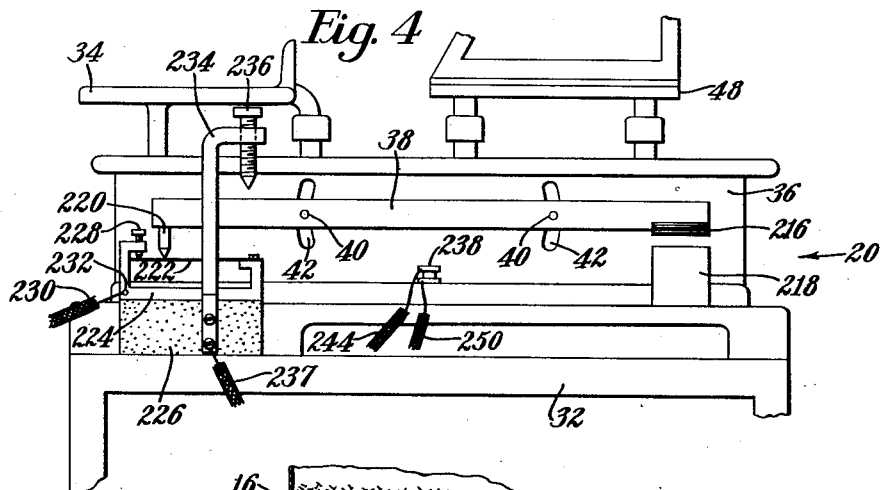
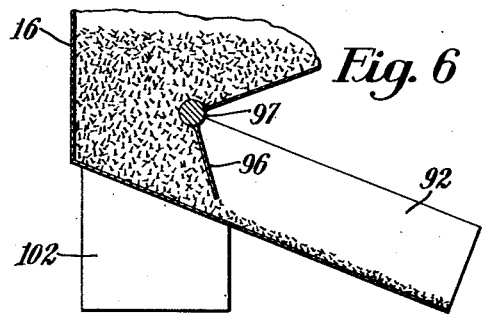
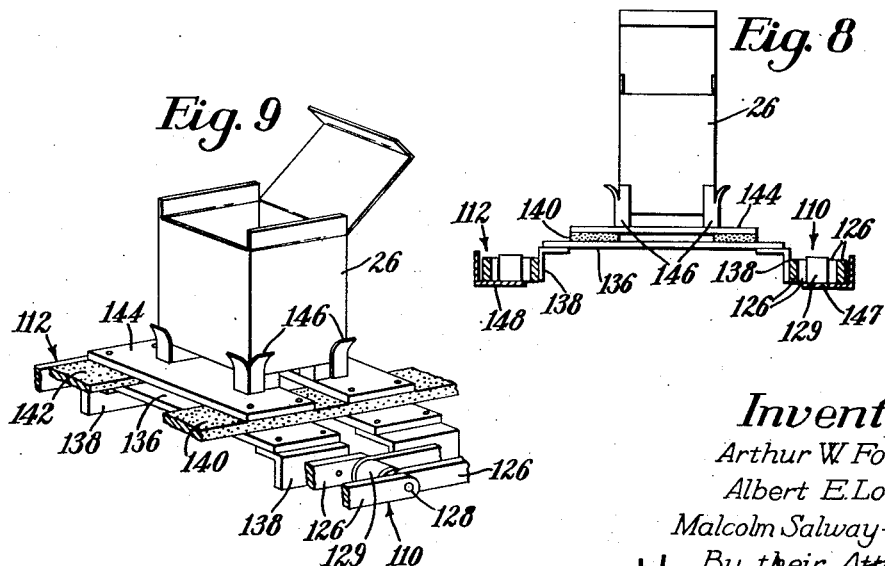
*Inventors*
Arthur W. Forman
Albert E. Lovett
Malcolm Salway-Waller
By their Attorney

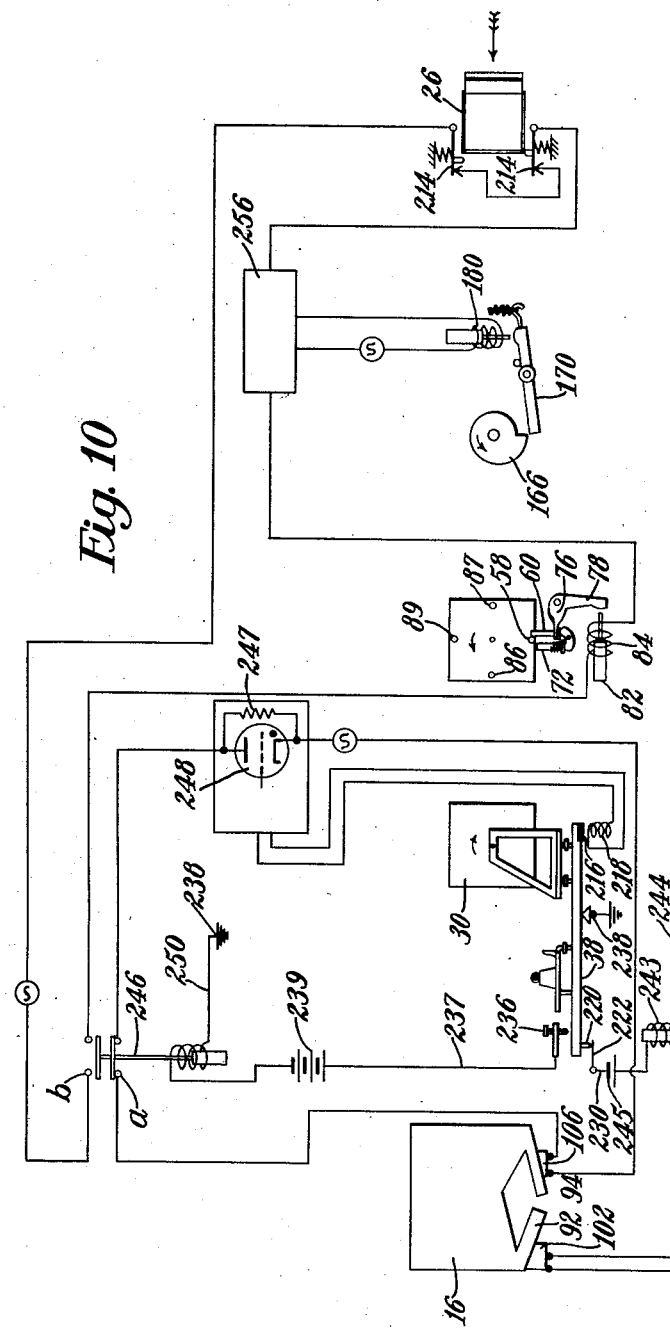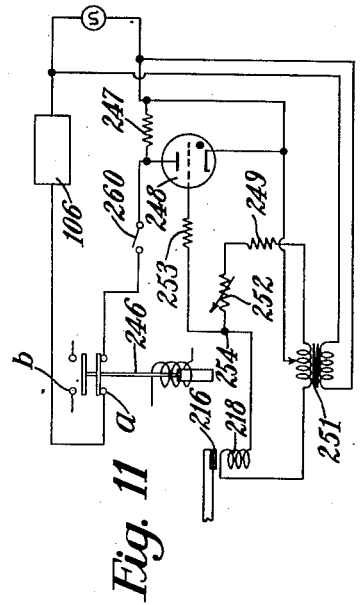

United States Patent Office 2,815,920
Patented Dec. 10, 1957

2,815,920

AUTOMATIC WEIGHER

Arthur W. Forman, Pinner, and Albert Edward Lovett and Malcolm Salway-Waller, Leicester, England, assignors to United Shoe Machinery Corporation, Flemington, N. J., a corporation of New Jersey Application August 10, 1953, Serial No. 373,320

Claims priority, application Great Britain August 30, 1952

2 Claims. (Cl. 249—18)

This invention is concerned with improvements in or relating to machines for automatically measuring bulk material and will be described hereinafter by way of example with reference to a weighing machine adapted for use in weighing and delivering a predetermined quantity of tacks, it being realized that the invention is also applicable to machines adapted to weigh other material.

In the past, it has been a common practice to weigh one pound portions of tacks into cartons by hand. Hand weighing has been slow and, due to the labor involved, costly.

It is one of the various objects of the present invention to provide an automatic weighing machine to which tacks and empty cartons can be supplied and which will fill the cartons each with one pound of tacks.

To this end, and in accordance with a feature of the present invention, there is provided an improved automatic weighing machine adapted to weigh and deliver into cartons one pound portions of tacks. The illustrative machine comprises a hopper which can be filled with tacks, a lever balance, a scale pan, a conveyor, and delivery mechanism. The conveyor has a belt adapted to carry the cartons, and driving means for moving the belt in a step-by-step manner to position each carton in turn in a delivery station. The delivery mechanism is operable to deliver the contents of the scale pan into a carton at the delivery station and includes a chute down which weighed portions of tacks fall from the scale pan upon actuation of the delivery mechanism under the control of the balance when a predetermined quantity of tacks has been received in the pan.

In accordance with another feature of the invention, means is provided to render the driving means inoperative to advance the belt during delivery of the pan contents, thereby to insure that the belt does not move a carton so positioned away from the chute while tacks are pouring down the chute.

The illustrative machine is so arranged that the balancing parts of the balance swing freely during the final stages of weighing, being free at the point of balance, and that the last two ounces of the pound to be weighed are fed to the scale pan in a gradually and continuously diminishing rate of feed, the rate of feed being controlled by an electronic circuit including a variable inductance, a core of which is mounted on an arm swinging with the balancing parts of the balance, and a coil of which is mounted upon a stationary part of the machine.

By providing, in the preliminary stages of measuring, a relatively high, fixed rate of feed, and in the final stages a continuously diminishing rate of feed, a somewhat shorter time is required for the measuring than were the rate of feed reduced throughout the weighing continuously or in a step-by-step manner.

The above and other of the various objects and the several features of the present invention will become clear from the following description, to be read with reference to the accompanying drawings, of the said illustrative weighing machine; it will be realized that the illustrative weighing machine has been selected for description by way of example and not of limitation of the invention.

In the accompanying drawings:

Fig. 2 is a right side elevation showing a scale pan and delivery chute of the machine of Fig. 1, on a larger scale;

Fig. 3 is a plan view partly in section showing delivery mechanism of the machine of Fig. 1;

Fig. 4 is a left side elevation taken from the back of Fig. 1 to show an auxiliary arm connected to balancing parts of the machine of Fig. 1;

Fig. 5 is a front elevation of the machine of Fig. 1;

Fig. 6 is a view in section showing an adjustable gate associated with a feed chute of the illustrative machine;

Fig. 7 is a right side elevation partly in section showing the front portion of a conveyor of the illustrative machine on a scale larger than Fig. 1;

Fig. 8 is a section on the line VIII—VIII of Fig. 7, of a conveyor belt of the illustrative machine;

Fig. 9 is an angular view of part of the conveyor belt of the illustrative machine;

Fig. 10 is a diagram showing the operation of the electric control circuits of the illustrative machine; and Fig. 11 is a schematic diagram of a dribble feed vibrator control circuit of the illustrative machine.

Figure 1:
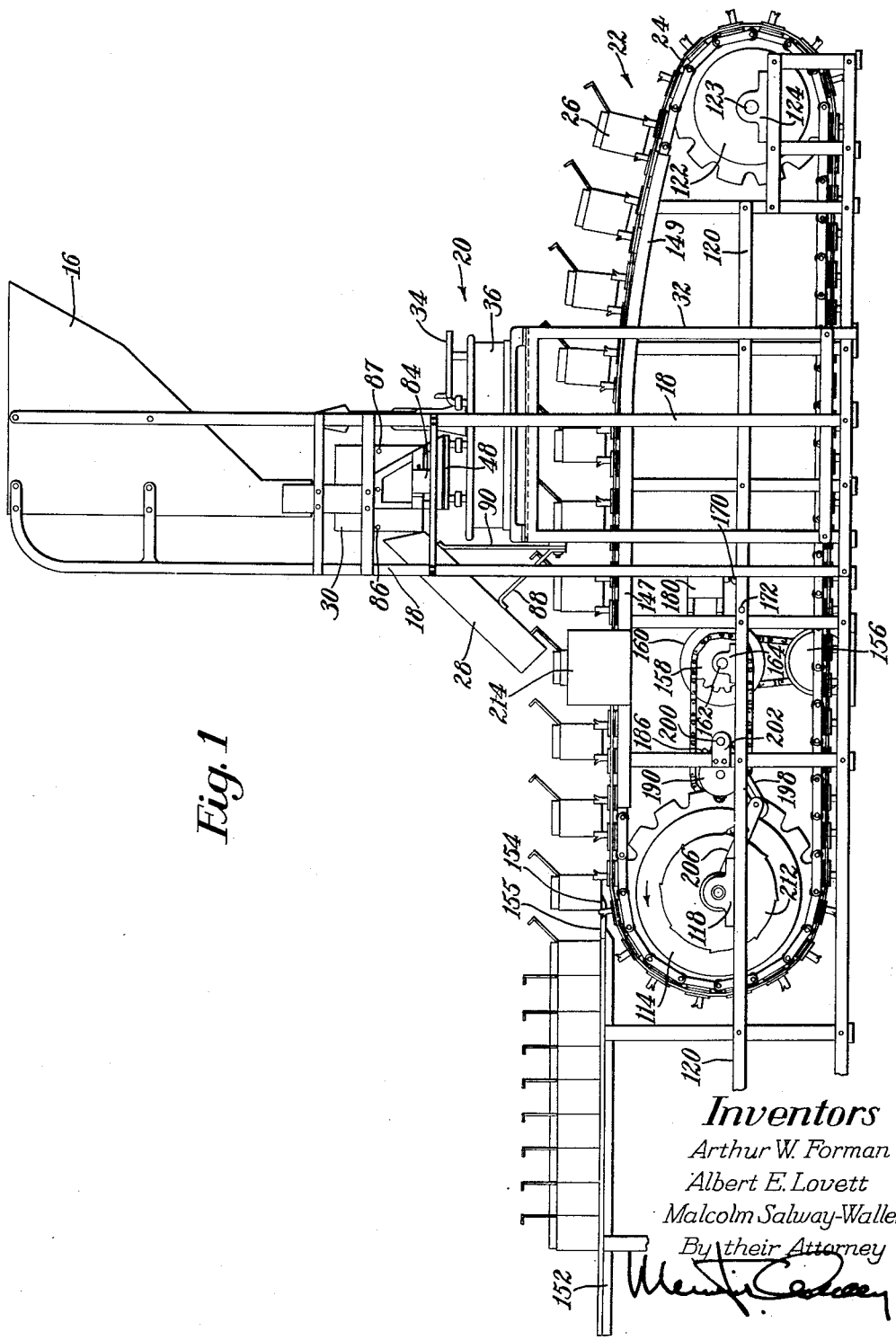
Fig. 1 is a right side elevation of a machine embodying the invention.

The illustrative weighing machine is an automatic weighing machine adapted to weigh one pound portions of material into cartons and will be described hereinafter with reference to weighing tacks, although it will be realized that it may be used for weighing other material.

Referring to Fig. 1, the machine comprises a hopper 16 supported by an upright frame 18, a balance 20, and a conveyor designated generally by the numeral 22. The conveyor 22 comprises a belt 24 adapted to carry receptacles, shown as cartons 26, from rear to front of the machine, the belt being driven to present the cartons in a step-by-step manner to a delivery station beneath a delivery chute 28 down which weighed portions of tacks fall from a scale pan 30 upon actuation of a delivery mechanism.

The balance 20 stands on a framework 32. The balance 20 is of a conventional lever type having a platform 48 carrying the scale pan 30, and a platform 34 weighted normally to counterbalance the platform 48 with the pan 30 thereon. The balance 20 has a scale and pointer (not shown) registering (by parts of an ounce) up to one pound. Normally, if it is desired to weigh a portion lying in a range between one and two pounds on the balance, a one pound weight is put on the platform 34; the lever and pointer then remain stationary until one pound is reached at which time the lever begins to swing and the pointer moves progressively across the scale during the addition of the second pound. The balance 20, as used for weighing one pound portions of tacks, in the illustrative machine, has a fourteen ounce weight 33 (Fig. 2) upon the platform 34 so that the lever and pointer remain stationary until fourteen ounces have been added to the scale pan, the addition of one pound causing the pointer to reach that portion of the scale marked "two ounces."

The balance 20 comprises a box 36 (Fig. 4) inside which are situated the lever and associated mechanism and has an auxiliary arm 38 situated at the left of and outside of the box 36 and connected to balancing parts of the balance by pins 40, 40 passing through slots 42, 42 in the side of the box 36 so that the arm 38 swings with the lever of the balance. Thus the arm 38 remains stationary during weighing until fourteen ounces have been added to the scale pan and then swings during addition of the next two ounces.

The scale pan 30 of the balance 20 is mounted for rotation about a horizontal shaft 44 (Fig. 2) supported on a frame 46 carried upon the platform 48. The pan 30 comprises side walls 50, 52 and is divided into four trough-like compartments by plates lying parallel to the shaft 44 whereby the compartments are symmetrically arranged about the axis of rotation. The compartments are so formed by the side walls 50, 52 and by a plate 54 and a plate 56 in the manner shown in Fig. 2 that when a given compartment, e. g. A, is upright in a receiving position, the bottom of the compartment lies to one side, that is, the front, of the shaft 44. The centre of gravity of tacks poured into the compartment A of the scale pan 30 from the hopper 16 as shown in Fig. 2 thus lies in front of the shaft 44, and the pan 30 is prevented from rotating forwardly about the shaft only by engagement between a lug 58 (Figs. 2 and 3) which is one of four lugs 58, 86, 87 and 89 (Fig. 10) mounted on the side wall 52, and an inside end portion of an axially slidable stop pin 60 (Fig. 3). The other three compartments of the scale pan are similar to compartment A, and in turn occupy the same position, relative to the hopper 16, as compartment A each time the scale pan 30 makes a quarter revolution upon the shaft 44.

The delivery mechanism comprises the stop pin 60 slidably mounted in a bore in a boss 62 (Fig. 3) secured to a strap 47 extending horizontally between the vertical member of the frame 46. The pin 60 has a head 64 which bears against one end of a curved arm 66 pivoted at its centre to a bracket 68 secured to the strap 47. The other end of the arm 66 engages a head 70 of a second stop pin 72 also mounted in a bore in the boss 62. A compression spring 74 is situated between the head 70 of the pin 72 and the strap 47 so as to urge the arm 66 counterclockwise as viewed in Fig. 3, and thus to urge the pin 60 into a position in which its inside end portion may engage a lug, for example, the lug 58 and thereby prevent further rotation of the pan 30. A bell crank lever having two arms 76, 78 is mounted on a pivot 80 carried by the strap 47. The arm 76 encircles the pin 60 inside the head 64 so that turning of the lever 76, 78 about its pivot counterclockwise (Fig. 3) withdraws the pin 60 from engagement, for example, with the lug 58. Turning of the lever 76, 78 is effected, in the operation of the illustrative machine, by pressure against the arm 78 by a member 82 arranged for extension by the core of a solenoid 84 mounted upon the frame 18. The arrangement of the delivery mechanism is such that if, when the solenoid 84 is energized to pull the pin 60 out of engagement with a lug when the upper compartment contains tacks, the pan 30 tips forwardly through a quarter of a revolution and the tacks fall down the chute 28. Rotation of the pan 30 through more than a quarter of a revolution is prevented by the pin 72 which is pushed by the arm 66 into lug-engaging position at the same time the pin 60 is pulled out of lug-engaging position. When the solenoid 84 is deenergized, the pins 60, 72 return to their former positions, the pan 30 coming to rest with the next lug against the pin 60 after having made a quarter of a revolution thereby delivering the tacks from the erstwhile upper compartment down the chute 28 which is mounted upon two supporting arms 88 and 90 secured to the front of the framework 32.

The hopper 16 of the illustrative machine is mounted upon its framework 18 above the balance 20; it has a sloping floor from which depend two chutes 92, 94 (see Fig. 5). The chute 92 is shorter and more steeply inclined than the chute 94. Entrance of tacks to the chutes 92, 94 is governed by two adjustable gates, the gate 96 of the chute 92 being shown in Fig. 6. The gate 96 comprises an imperforate shutter pivotally mounted on a horizontal axle 97 rotatable by means of a knob 98 (Fig. 5). The gate on the chute 94 is similar, being adjustable by a knob 100. The chute 92 is used for bulk feed, and the chute 94 for dribble feed, as will be further explained hereinafter. The gate 96 on the chute 92 is kept wider open than the gate on the chute 94.

An electrically operated vibrator 102 is mounted upon a bracket 104 secured to the framework 18 below the chute 92 and in operative association with the chute 92 so that when current passes through the vibrator 102, the chute 92 is vibrated to cause tacks to flow from the hopper down the chute. Current through the vibrator 102 is made and broken in a manner hereinafter described. The chute 92 and vibrator 102 are of a type commercially available under the trade name "Type F-01 Syntron Feeder" supplied by Riley Stoker Co. Ltd. of London.

A similar vibrator 106 is similarly mounted upon a bracket 108 in operative association with the chute 94. Current through the vibrator 106 is controlled in a manner hereinafter described.

The conveyor belt 24 (Fig. 1) of the illustrative machine passes from rear to front, i. e. right to left in Figs. 1 and 7, through the frame 18 and the framework 32 below the balance 20. The belt 24 comprises a chain 110 (Fig. 7) running over a large front sprocket wheel 114 fixed upon a shaft 116 journaled in bearings 118 supported upon a framework 120 and over a smaller sprocket wheel 122 fixed upon a shaft 123 journaled in bearings 124 at a rear end of the framework 120. The chain comprises pairs of links 126 connected together by pins 128 (see Figs. 7 and 9), the pins 128 supporting sleeves 129, which mesh with recesses 130 in the periphery of the wheels 114, 122. A second chain 112 parallel to the chain 110, having similar links 126, pins 128 and sleeves 129 runs over similar sprocket wheels, of which only the large front wheel 132 is shown (Fig. 5), fixed upon the shafts 116 and 123.

Between the chains 110, 112 extend plates 136 (Fig. 9), each secured to angular bracket members 138 secured to inner ones of the pairs of links 126. Upon the plates 136 rest two bands 140, 142 of flexible material to which are secured metal plates 144, each mounted opposite one of the plates 136. Each pair of two adjacent plates 144 is adapted to support a carton 26 for one pound of tacks, and for this purpose a set of lugs 146 is brazed on to each pair of the plates 144, one lug for each corner of the carton, two lugs being on one of the plates and two on the next, the lugs having upstanding ears of spring metal so that they grip the carton between them. The lugs are constructed to support each carton in a position raised about half an inch above the plates 144, and the transverse grip upon the back of the carton by the rear pair of lugs is tighter than the grip by the front pair.

The chains 110, 112, plates 136, bands 140, 142, plates 144 and lugs 146 as a whole constitute the conveyor belt 24 of the illustrative machine. The sleeves 129 on the pins 128 ride over guideways 147, 148 (Fig. 8), one being fixed to the framework 120 at each side of the belt 24 between the front and rear sprocket wheels, to support the belt 24 so that it rides gradually up along curved portions (one portion 149, being shown in Fig. 1) of the guideways from the rear sprocket wheels and then horizontally to the front wheels 114, 132, being horizontal beneath the chute 28. The arrangement is thus such that the ears of the lugs 146, being radial to the rear wheels as the belt 24 passes over them, gradually assume parallel vertical positions as the belt 24 becomes horizontal, enabling an operator to insert a carton 26 between the lugs while their tops are slightly spread lengthwise of the belt as it is moving along the curved portions of the guideways 147, 148. The lugs thereafter come into full gripping positions when the belt 24 is horizontal. As the belt 24 moves over the front sprocket wheels 114, 132, as best seen in Fig. 7, the front of the carton rides on to a table 152 supported on the framework 120 at the front of the illustrative machine, a rear edge 154 of a projecting lip 155 of the table 152 being located in a position to receive the carton vertically above the shaft 116 upon which the front sprocket wheels 114, 132 are mounted. Once on the table 152, each carton 26 is pushed along by subsequent cartons until removed, conveniently by a second operator.

The conveyor belt 24 of the illustrative machine is driven in a step-by-step manner, each step of the belt 24 being equal in length to the distance between the front edges of the cartons 26 carried upon the belt 24 so that successive cartons are brought one at a time to the same position in the delivery station below the chute 28.

To this end, the driving means comprises an electric motor 156 (Fig. 1) arranged to drive a sprocket wheel 158 through variable speed reduction gearing (not shown) and a slip clutch 160. The slip clutch 160 and sprocket wheel 158 are freely mounted upon a shaft 162 mounted in bearings 164 on the framework 120. The slip clutch 160 is arranged so that when it is being driven by the motor 156 and no slip is taking place in the clutch it transmits the drive from the motor 156 to the sprocket wheel 158 and to a cam 166 (Fig. 7) and rotates them counterclockwise. The cam 166 is provided with an abutment face 168. A cam stop lever 170 is pivoted upon the framework 120 by a pin 172 and has a forwardly extending arm 174, a flat end face 176 of which is constituted by the surface of a compressed fibre buffer. The lever 170 is arranged to swing about the pin 172 into and out of an operative position in which the face 176 lies in the path of movement of the face 168 of the cam 166 when the latter rotates; engagement of the face 168 by the face 176 stops the cam 166 and the sprocket wheel 158, the clutch 160 then slipping while the motor 156 continues to run. The lever 170 is normally held out of its operative position by a spring 178, and is put into operative position by the action of a solenoid 180 having a core 182, the solenoid 180 being mounted on the framework 120 and arranged to extend its core when energized. The circumstances under which the solenoid 180 is energized will be described later.

The sprocket wheel 158 (Fig. 1) is connected by a chain 184 to another sprocket wheel 186 (Fig. 7) fixed upon a shaft 188 journaled in bearings, one at the left hand side and one in the middle of the framework 120. Also fixed upon the shaft 188 at its right end is a wheel 190 having a pin 192 projecting from a flat side face of the wheel. A sleeve 194, freely rotatable on the pin 192, rides in a slot 196 of a lever 198 pivoted at one end upon a pin 200 mounted in a bracket 202 on the framework 120 (Fig. 1). Also riding in the slot 196 is a sleeved pin 204 fixed to a free end portion of a lever 206 freely mounted upon the shaft 116. A pawl 208 is pivoted upon the lever 206 and urged by a spring 210 into engagement with a toothed periphery of a flanged portion 212 of the sprocket wheel 114.

When the sprocket wheel 186 is driven counterclockwise in the operation of the illustrative machine, the pin 192 swings the lever 198 up and down about the pin 200, the arrangement being such that the lever 198 takes twice as long to swing down as it takes to swing up. The up and down swinging movement of the lever 198 is imparted to the lever 206 by the pin and slot connection 204, 196. The spacing of the teeth around the periphery of the flanged portion 212 of the wheel 114 is such that each time the lever 206 swings up, the pawl 208, bearing against one of the teeth, drives the wheel 114 (and the shaft 116 and wheel 132) counterclockwise through an eighth of a revolution, the lever 206 and pawl 208 then swinging freely downwards to permit the pawl 208 to drop over the next tooth. Thus, it will be realized, the conveyor belt 24 is moved forwards in a step-by-step manner, the belt 24 being at rest between successive steps for twice the time taken to move a step forward. Each step of the belt 24 may thus serve to bring an empty carton 26 to the same position in the delivery station beneath the chute 28.

In the illustrative machine, the sprocket wheels 158, 186 are the same size, and the cam 166 and wheel 190 are orientated with respect to one another so that at the instant when the lever 198 is in its lowermost position the face 168 of the cam 166 is in a position such that if the solenoid 180 is then energized to raise the arm 174 of the lever 170, the face 168 will come immediately into engagement with the face 176 of the lever 170 and the cam 166 will be stopped thereby rendering the conveyor driving means inoperative.

The variable speed reduction gearing referred to above permits adjustment of the speed of the conveyor belt 24, such adjustment being desirable to suit various kinds of material being weighed, for example nails and tacks of different sizes and made from different materials, e. g. strip metal and wire. It will be realized, however, that the ratio of time that the conveyor belt 24 is stationary to the time that it is moving, remains constant, viz. two to one, this ratio being determined by the arrangement of the wheel 190, levers 198, 206 and sprocket wheel 114. To vary the said ratio, it is this arrangement that would have to be changed; a ratio of one to two would be obtained, however, merely by reversing the direction of rotation of the sprocket wheel 186.

The front face of the one of the cartons 26 on the conveyor belt 24 which is in position beneath the chute 28 to receive tacks therefrom is engaged by operative parts of two microswitches of conventional design. These two microswitches are housed in a box 214 (Fig. 1) supported on the framework 120 and are electrically connected in series. The switches are so arranged that they are both "on" (i. e. closed) only when a carton 26 is so positioned in the delivery station beneath the chute 28 that tacks falling from the chute will be received in the carton. One of the switches is "off" (i. e. open) if the carton has not reached such a position; the other is switched "off" if the carton moves ahead of such a position; the switches are shown diagrammatically at 214 in Fig. 10 at the bottom and top respectively of the box in the diagram.

Turning now to Figs. 4 and 10, the auxiliary arm 38 of the balance 20 carries at its front end (the right hand end as seen in these figures) a soft iron laminated core 216 of a variable inductance, a coil 218 of which is mounted upon the box 36. At the rear end of the arm 38 is mounted a contact pin 220 which, when the weight-carrying platform 34 is down (viz. before fourteen ounces of tacks have been received in the scale pan 30), bears against a contact spring 222 mounted upon a metal conducting support 224 which, in turn, is mounted upon a block 226 of insulating material upon the framework 32. An adjustable screw 228 limits upward movement of the contact spring 222. An electrical conducting lead 230 is connected to the support 224 at 232. Also secured to the insulating block 226 is an upright conducting post 234 carrying at its upper end a contact screw 236; a conducting lead 237 is connected to the bottom of the post 234. The screw 236 is adjusted so that the arm 38 makes contact with it at the instant that one pound of tacks has been received in the scale pan to complete an electrical circuit (as hereinafter described) and also to limit swinging movement of the arm 38 clockwise. The arm 38 is electrically connected to a ground terminal 238 on the box 36.

There are three principal electric circuits on the illustrative machine, viz. a bulk feed vibrator circuit, a dribble feed vibrator control circuit and a delivery control circuit. These will be described separately.

*Bulk feed vibrator circuit*

Referring to Fig. 10, the vibrator 102 is connected to be energized from an A. C. source through the contacts of a relay switch 242 and a variable resistance 240, the latter being shunted by a rectifier 241. The coil 243 of the relay switch 242 has one terminal connected to ground by a lead 244 and another terminal connected through a power source 245 and lead 230 to the contact spring 222 and thence to contact pin 220.

The circuit is thus so arranged that when the grounded pin 220 and the spring 222 are in contact, the contacts of the relay switch 242 are closed and current passes through the vibrator 102. The amplitude of vibrations set up by the vibrator can be varied by varying the resistance 240. The amplitude and the position of the gate 96 are suitably adjusted so that tacks flow quickly down the chute, about fourteen ounces being poured into the scale pan 30 in about two seconds, the current being then cut off as the arm 38 begins to swing clockwise, disengaging the pin 220 from the spring 222.

Dribble feed vibrator control circuit

The vibrator 106 is arranged to be connected to an A. C. power supply through the lower contacts of a relay switch 246 and a gas-filled triode 248 (Fig. 11).

The relay switch 246 is opened and closed by a circuit which includes the screw 236, lead 237, a power source 239, a lead 250 to the ground terminal 238, and the auxiliary arm 38 of the balance 20. When the arm 38 is out of contact with the screw 236, contacts a of the relay switch are closed and current flows through the vibrator circuit; when the arm 38 makes contact with the screw 236, the contacts a are opened and current ceases to flow through the vibrator circuit.

Turning to Fig. 11, the cathode of the triode 248 is connected to one A. C. supply terminal while the anode is connected through a switch 260, the switch 246 and vibrator 106, to the other terminal, a resistor 247 being connected across the cathode and anode. The cathode is also connected to the center tap of a transformer 251 coupled to a phase shift circuit comprising a fixed resistor 249, a variable resistor 252 and the variable inductor constituted by the core 216 on the auxiliary arm 38 of the balance 20 and the coil 218. The grid of the triode 248 is connected through a resistor 253 to the phase shift circuit at a point 254 between the variable inductor 216, 218 and the variable resistor 252.

Current passing through the vibrator 106 is thus controlled by the triode 248, half-wave impulses of the alternating current only being allowed to pass, and their duration being governed by the phase relationship between the voltages applied to the anode and grid. This phase relationship is determined by the variable inductor 216, 218, the greater the inductance provided thereby the more the phase at 254 (and the grid) lags behind the phase imposed on the anode. Thus the greater the inductance of the variable inductor 216, 218, the less the current passing through the vibrator 106.

Now until the arm 38 of the balance 20 begins to swing, i. e., until fourteen ounces of tacks have been received in the scale pan 30, the inductance of the variable inductor 216, 218 is a minimum, and the current passing through the vibrator 106 is a maximum and the rate of tack flow through chute 94 can be determined by adjustment of the variable resistance 252 and by adjustment of the gate on the chute 94. When fourteen ounces of tacks have been received in the scale pan 30, the arm 38 begins to swing and the vibrator 102 is cut off, tacks thereafter falling into the scale pan 30 from the chute 94 only, and as tacks fall from the chute 94 the arm 38 gradually swings (clockwise as seen in Fig. 4) and the core 216 gradually approaches the coil 218 to increase the inductance of the variable inductor 216, 218. Current passing through the vibrator 106 is thus gradually reduced and the rate of flow of tacks down the chute 94 is gradually and continuously reduced until, as the lever of the balance 20 reaches its point of balance and the arm 38 is about to make contact with the screw 236, the tacks are falling one by one at intervals from the chute 94. The rate of flow of tacks down the chute 94 while the arm 38 is swinging is thus related to the quantity of tacks still to be weighed. When one pound of tacks has been received in the pan 30, the arm 38 makes contact with the screw 236 and the relay switch 246 is opened to cut off current through the vibrator 106 altogether. It will be realized that while the arm 38 is swinging and at the point of balance, the balancing parts are quite free from mechanical resistance offered by any parts which might upset the accuracy of weighing.

Delivery control circuit

The relay switch 246 when energized, besides opening contacts a in the dribble feed vibrator control circuit, closes a set of contacts b in a delivery control circuit which comprises, in series, contacts b of the switch 246, the solenoid 84, a one second duration relay switch 256 (controlling the solenoid 180 for inhibiting the conveyor driving means) and the microswitches 214 (which are closed when a carton 26 is in position beneath the chute 28).

For current to flow through the delivery control circuit, this circuit must be closed through contacts b of the switch 246 and both the microswitches 214; that is to say, current will only flow when the arm 38 makes contact with the screw 236 (i. e. one pound of tacks has been received in the pan 30) and a carton 26 is in position to receive delivery of the tacks if the scale pan 30 is released to rotate. When these conditions are both satisfied, current flows through the circuit and the solenoid 84 is energized to allow the scale pan 30 to rotate through a quarter of a revolution and the tacks to fall therefrom down the chute 28 into the carton 26 positioned thereneath and at the same time to actuate the duration relay switch 256. The switch 256 is of conventional type, and maintains flow of current through a subsidiary circuit comprising the solenoid 180 for so long as current is supplied to the switch 256 and for one second after such current is cut off. In the illustrative machine, current through the solenoid 84 and switch 256 is always cut off immediately after it is made because the solenoid 84 trips the scale pan which rises as soon as the tacks begin to fall out and thus breaks its contact with the screw 236 allowing the contacts b of switch 246 to open the delivery control circuit. Nevertheless, the duration relay switch 256 maintains the flow of current through the solenoid 180 and keeps the lever 170 in its operative position for one second. Thus, the conveyor belt 24 is prevented from moving when, or within one second after, the scale pan 30 is tripped, thereby preventing the carton 26 from being moved away from the chute 28 while the tacks are pouring down the chute 28. On the other hand, should one pound of tacks be received into the scale pan 30 and the switch 246 be actuated to close the delivery control circuit while the conveyor belt 24 is moving, or while it is stationary but without a carton 26 in it beneath the chute 28, the microswitches 214 will not both be closed, and therefore current will not flow through the circuit and the scale pan 30 will not be released; the solenoid 180, likewise, will not be actuated and the conveyor belt 24 will continue to exercise its step-by-step movement until a carton 26 comes into position beneath the chute 28 to close both microswitches and allow current to flow through the delivery control circuit.

The speed of weighing of the illustrative machine depends upon the material being weighed. Tacks cut from strip metal flow somewhat less readily than tacks made from wire and it may be found that a somewhat longer time is desirable to obtain accurate weighing of one pound portions of the former; the illustrative machine may also, of course, be used for weighing other material altogether different from tacks. It is clearly desirable to adjust the variable speed reduction gearing so that the step-by-step movement of the conveyor belt 24 is kept in phase with the tripping of the scale pan 30, the pan 30 being arranged to trip, for example, shortly after the conveyor belt 24 places a fresh carton beneath the chute 28. However, if the period of the belt 24 (i. e. the time the sprocket wheel 190 takes to make one revolution) is slightly longer than the weighing period (i. e. the time between successive releases of the pan 30), sooner or later the time will come when a carton is not in position beneath the chute 28, and, both the microswitches 214 not being closed, release of the scale pan 30 will be delayed until a carton is in position. Once this condition arises, it will persist (if the weighing period is constant) unless the operator takes steps to remedy it, for example by adjustment of the variable speed reduction gearing. On the other hand, if the period of the belt 24 is slightly shorter than the weighing period, the time will come when the conveyor belt 24 is ready to move while the lever 170 is still in its operative position. The clutch 160 will then slip until the lever returns to its inoperative position. Since, ex hypothesi, the period of the belt is shorter than the weighing period, this condition, too, will persist (if the weighing period is constant) until the operator takes steps to remedy it, for example by adjustment of the variable speed reduction gearing; this latter condition, however, does not prejudice the output of the illustrative machine, since the output is necessarily governed by the weighing operation, and the weighing operation is not delayed but it may create undue wear on the slip clutch 160.

For weighing one pound portions of tacks cut from strip using the illustrative machine, it has been found convenient to arrange for the first fourteen ounces of the portion to be received into the scale pan 30 (largely from the bulk feed hopper 92) in two seconds, and for the remaining two ounces to be received in a gradually diminishing dribble in four seconds; the pan then is released to rotate, and feeding of the next portion of tacks begins immediately. The weighing period is therefore six seconds and variable speed reduction gearing is adjusted to give a period of the belt 24 of six seconds also (i. e. four seconds stationary, two seconds moving).

Conveniently, in the operation of the illustrative machine, two operators stand one at each end of the conveyor 22. The one at the back takes an empty carton 26 from a stack which, being normally supplied folded flat, she opens out, tucks in the bottom, and places on the conveyor belt 24, lid to the rear, as the belt 24 rides over the curved portions 149 of the guideways 147, 148. As the belt 24 becomes horizontal, the ears of the lugs 146 grip the carton. The carton 26 is carried forward step by step until it is in position beneath the chute 28 where it receives one pound of tacks. It is then carried forward and deposited on the table 152 and pushed along by the cartons behind it until it is removed from the table by the operator at the front of the illustrative machine, who closes the lid of the carton.

If desired, the illustrative machine can be modified by arranging the conveyor 22 across the front of the balance instead of through the frameworks 18, 32. Such an arrangement may be preferred to facilitate access to the middle part of the conveyor and may also be preferred where two weighing machines are used together, facing one another, with one operator supplying both machines with empty cartons and another operator removing the cartons from both machines.

Having thus described our invention, what we claim as new and desire to secure by Letters Patent of the United States is:

1. In apparatus for automatically weighing out bulk material, a hopper adapted to hold bulk material, a weighing device comprising first and second platforms connected to a centrally fulcrumed lever, a scale pan supported upon one of said platforms, first and second feed chutes arranged to feed material from said hopper to said pan, first and second electrically operated feed control means respectively associated with the said first and second chutes and energizable to cause material to be fed through said chutes to said pan, a circuit for energizing said first control means including switch contacts arranged to be closed by said weighing device when the pan platform is in a raised position, and a circuit for energizing said second control means, said last circuit including a thyratron phase-controlled by a variable inductor controlled by said weighing device to provide a progressively decreasing rate of feed as the pan platform descends.

2. In apparatus for measuring bulk material, a hopper adapted to hold bulk material, load forming means for weighing out predetermined weight loads of said material, delivery means operable under control of said load forming means to transfer each load upon completion thereof from said load forming means to a delivery station, conveyor means movable to transfer receptacles into and through said station, drive means for said conveyor including a slip clutch, detent means operable to arrest the movement of said conveyor during operation of said driving means, and means controlled by said load forming means simultaneously with the operation of said delivery means for operating said detent means to permit movement of said conveyor by said drive means a predetermined time after initiation of the delivery of a load from the load forming means.

References Cited in the file of this patent
UNITED STATES PATENTS

| | | |
|---|---|---|
| 287,033 | Lewis | Oct. 23, 1883 |
| 679,968 | Inman | Aug. 6, 1901 |
| 860,392 | Lee | July 16, 1907 |
| 870,895 | Mitchell | Nov. 12, 1907 |
| 1,001,562 | Smith | Aug. 22, 1911 |
| 1,013,136 | Deats | Jan. 2, 1912 |
| 1,019,555 | Taylor | Mar. 5, 1912 |
| 1,374,876 | Bond | Apr. 12, 1921 |
| 1,739,061 | Cleaves | Dec. 10, 1929 |
| 1,739,862 | Robinson | Dec. 17, 1929 |
| 1,981,697 | Hartmann | Nov. 20, 1934 |
| 2,144,705 | Ober | Jan. 24, 1939 |
| 2,352,114 | Muskat | June 20, 1944 |
| 2,387,585 | Howard | Oct. 23, 1945 |
| 2,595,035 | Willbrandt | Apr. 29, 1952 |
| 2,597,831 | Willis | May 20, 1952 |
| 2,613,053 | Dorrington | Oct. 7, 1952 |
| 2,624,443 | Voller | Jan. 6, 1953 |
| 2,626,042 | Aldridge | Jan. 20, 1953 |
| 2,660,394 | Skeuse | Nov. 24, 1953 |